UNITED STATES PATENT OFFICE.

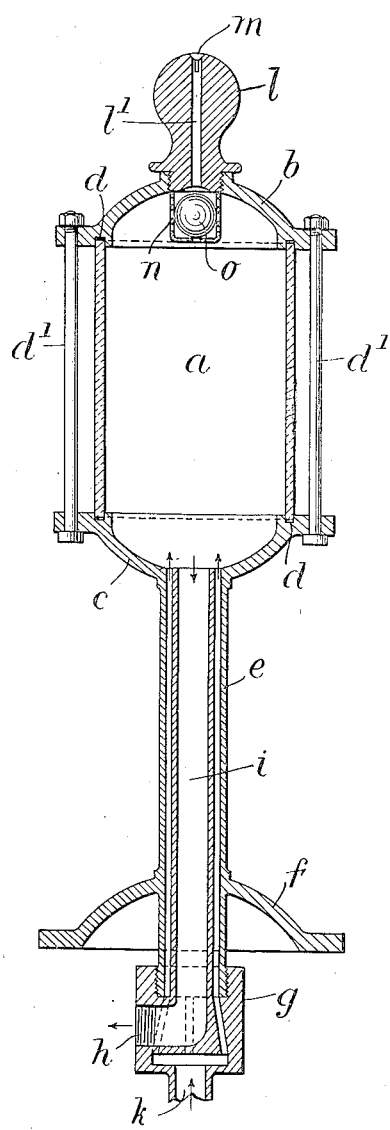

THOMAS CLAUDE WALTER, OF GRAVESEND, ENGLAND.

COUNTER APPARATUS FOR DISPLAYING AND DISPENSING BEER.

1,056,238.      Specification of Letters Patent.      Patented Mar. 18, 1913.

Application filed January 19, 1912. Serial No. 672,201.

*To all whom it may concern:*

Be it known that I, THOMAS CLAUDE WALTER, a subject of His Majesty the King of Great Britain, residing at Campbell Arms, Campbell Road, Gravesend, Kent, England, licensed victualer, and whose post-office address is Campbell Arms, Campbell Road, Gravesend, Kent, have invented a certain new and useful Counter Apparatus for Displaying and Dispensing Beer; and I do hereby declare the following to be a full, clear, and exact description of the invention, such as will enable others skilled in the art to which it appertains to make and use the same.

This invention relates to that class of apparatus for displaying and dispensing beer and other liquids under pressure wherein the beer or the like under pressure is forced into a transparent receiver from which latter it is supplied direct to the customer by means of a tap. The receiver is made transparent in order that the customer may see the liquid with which he is to be served. The receiver, it will be understood, is above the counter in full view and may be ornamented as desired. Hitherto the liquid has simply entered the lower end of the transparent receiver and been delivered from a tap provided on a head fitted at the upper end of the receiver. According to the present invention the liquid under pressure both enters and leaves the transparent receiver or displayer by admission and discharge pipes connected with its lower end, and the upper end of the receiver is furnished with a passage fitted with a non-return air valve, through which the air is expelled as the transparent receiver fills, and is also provided with a check float valve which when the receiver becomes filled or nearly filled with liquid automatically closes the air exit passage and prevents escape of liquid therethrough. The admission and discharge pipes are preferably arranged one within the other, the outer pipe providing a tubular standard adapted to support the receiver or displayer above a counter or the like. The discharge pipe leads to a suitable tap which may be located beneath the level of the counter if desired.

The annexed drawing shows in sectional elevation an apparatus constructed in accordance with my invention.

The transparent receiver for displaying the beer or other liquid to be supplied here consists of the glass cylinder $a$ fitting within annular grooves formed in a metal head $b$ and base $c$, $d$ indicating suitable rubber or other packing washers. By means of the bolts $d'$ passed through lugs on the head $b$ and base $c$ the cylinder $a$ is firmly and detachably held between said head and base. The base $c$ is located on the upper end of the tubular standard $e$ which is furnished near its lower end with the flange $f$ adapted to be secured to the counter or the like. On the lower end of the tubular standard $e$ is screwed the socket piece $g$ wherein is the passage $h$ screw threaded for connection of a supply tap of suitable construction (not shown) this passage leading to the tube $i$ which extends upward from the socket piece within the tubular standard $e$. The pipe $k$ at the lower end of the socket $g$ is to be suitably connected with the barrel or other container of the liquid in bulk which latter is forced up the pipe $k$ and the annular space between the pipe $i$ and the tubular standard $e$ into the transparent displayer $a$ and also down the pipe $i$ to the supply tap by fluid pressure preferably obtained by the introduction of $CO_2$ under pressure into the barrel or container, though other fluid pressure such as compressed air may be used if preferred.

In the head $b$ is screwed the plug $l$ traversed by the air passage $l'$ closed at the upper end by the non-return air valve $m$, and the lower end of this plug carries a cage $n$ containing a check float valve $o$, such as a rubber ball. The beer or other liquid forced into the displayer $a$ expels the air therein through the valve $m$ and when the liquid reaches the float check valve $n$ it closes the latter onto its seat at the lower end of the air passage $l'$. The escape of the liquid is thus prevented and the same is supplied to the customer direct from the receiver or displayer by opening the supply tap connected with the lower end of the pipe $i$. The non-return air valve $m$ may be furnished with a suitable projection or otherwise so constructed that it may be lifted by hand, if desired, to obtain a faster flow at the tap, atmospheric pressure being then added to the other pressure.

While the construction illustrated is of pleasing appearance, and adapted for ready disconnection of the various parts for cleaning and other purposes, the same may obviously be varied without departing from my invention.

What I claim and desire to secure by Letters Patent of the United States is:—

A device of the character specified, embodying therein a hollow tubular standard forming concentric telescoping inlet and discharge pipes, a supporting base carried at one end of said standard, a socket piece removably secured to the opposite end of said standard, said socket piece containing inlet and outlet passages, communicating, respectively, with said inlet and discharge pipes, a transparent liquid receiver secured to said base and in open communication with said inlet and discharge pipes, a head having a bored plug closing one end of said receiver, a non-return valve in the bore of said plug for governing the outflow of air from said receiver, a cage suspended immediately below said plug and a check valve in said cage to prevent the escape of liquid from said receiver through the bore in said plug.

In testimony whereof I have hereunto set my hand in the presence of two witnesses.

THOMAS CLAUDE WALTER.

Witnesses:
A. E. ALEXANDER,
EDITH HALL.